May 19, 1953   J. A. BANNEN   2,638,852
RAIL TRAILER CARRIER
Filed Jan. 24, 1950   3 Sheets-Sheet 1
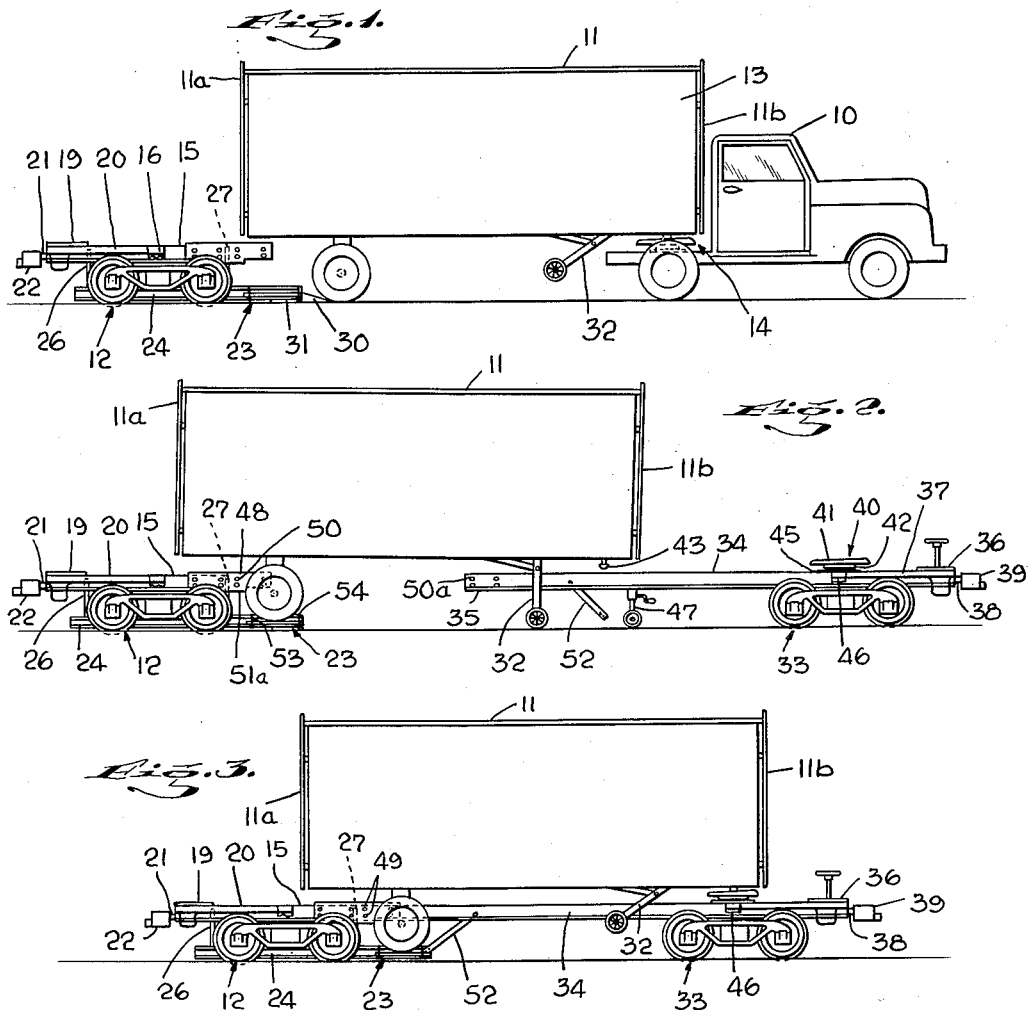
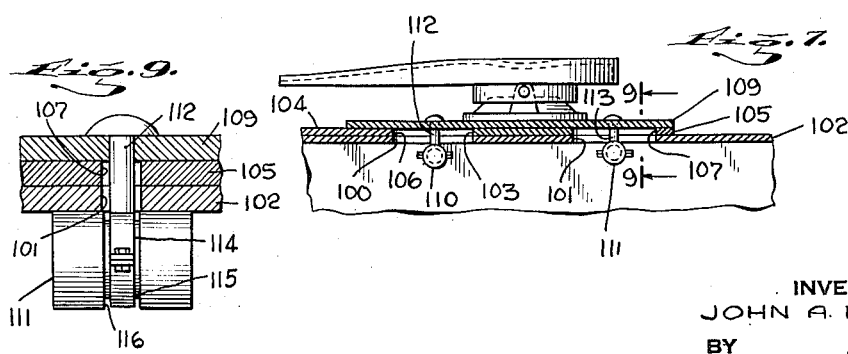
INVENTOR
JOHN A. BANNEN
BY Burgess, Ryan & Hicks
ATTORNEY

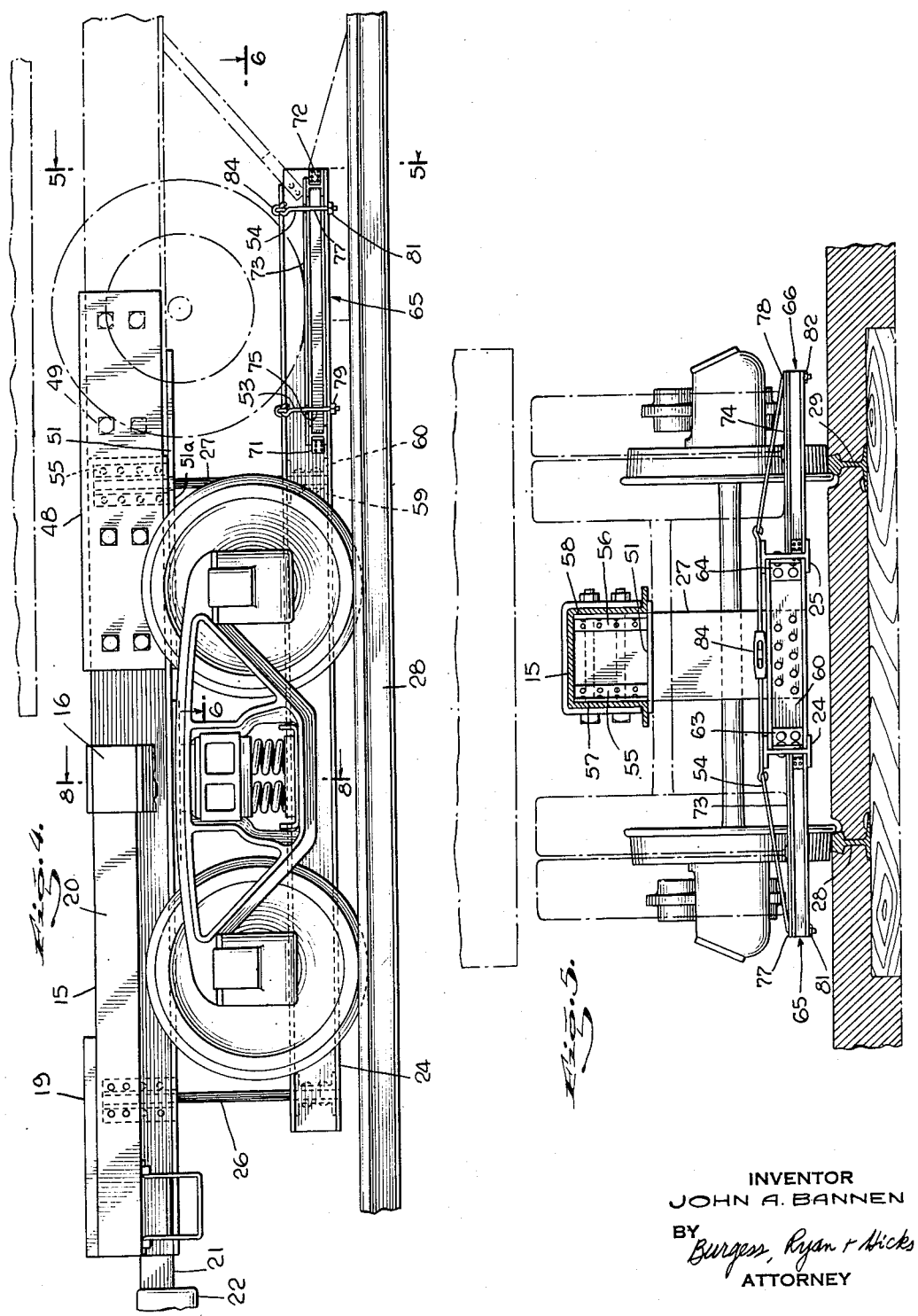

May 19, 1953  J. A. BANNEN  2,638,852
RAIL TRAILER CARRIER
Filed Jan. 24, 1950  3 Sheets-Sheet 3
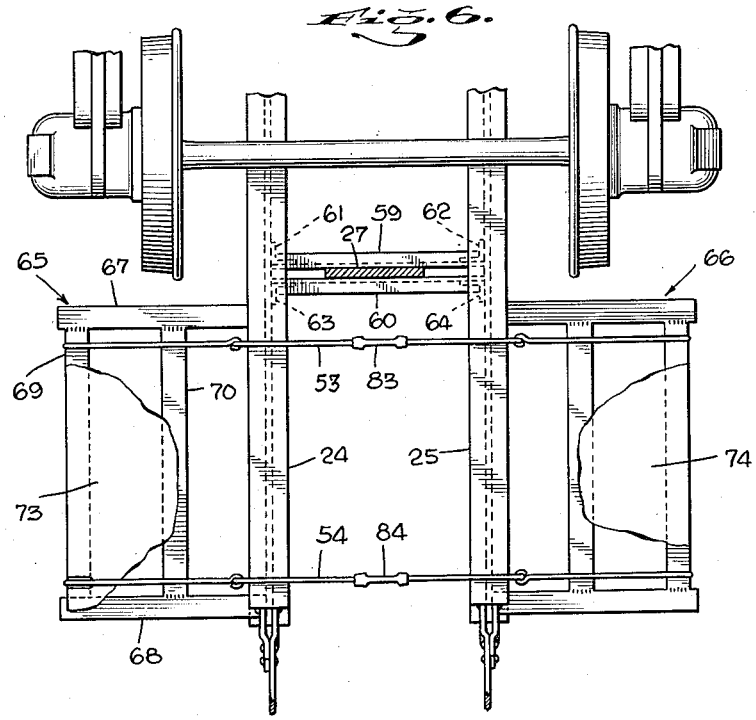
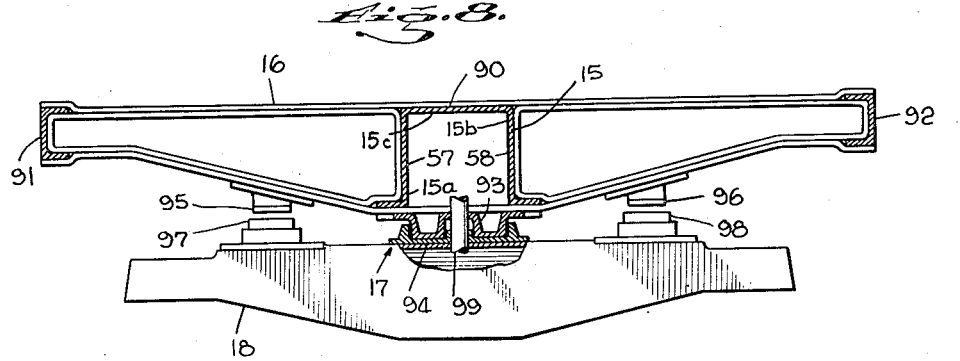
INVENTOR
JOHN A. BANNEN
BY Burgess, Ryan + Hicks
ATTORNEY Patented May 19, 1953

2,638,852

UNITED STATES PATENT OFFICE 2,638,852

RAIL TRAILER CARRIER

John A. Bannen, Bronx, N. Y.

Application January 24, 1950, Serial No. 140,187

9 Claims. (Cl. 105—159)

This invention relates to what for convenience may be called a rail trailer carrier, that is, a vehicle adapted to travel over railroad tracks as a unit of a train of cars and to transport thereon a trailer of the sort which is conventionally coupled to and hauled by motor cabs. More particularly, it relates to a rail trailer carrier comprising front and rear railway car trucks having wheeled axles, each of said trucks having a chassis member mounted thereon with means for detachably connecting the chassis member of one truck to the chassis member of the other truck. One of the trucks is provided with a platform supported at the back end of the truck at a height intermediate the tops and bottoms of the wheels, this platform being adapted to receive and support thereon the rear wheels of a trailer. The other truck is provided with suitable receiving means for supporting that end of the trailer which is ordinarily coupled to the motor cab.

In the present system of hauling freight by trailers attached to motor cabs, a great disadvantage resides in the fact that frequently the trips are too far to be traveled entirely by motor truck, so that a part of such trips must be made by freight train. This requires excessive handling of the freight, for it must be unloaded from the trailers and loaded onto freight cars, and at the end of the train trip it must be transferred from the freight cars to trailers waiting to receive it. This double operation of transferring the freight requires, of course, extra time, labor, and money and increases the hazard of loss due to damage and breakage. The present invention has as one of its primary objects the elimination of the foregoing disadvantages while at the same time preserving the useful features of both motor trucking and railroad hauling, namely, the convenience of door to door pick-up and delivery of freight which motor trucking provides, and the convenience, economy, and efficiency of railroad hauling for long trips. Thus, according to the invention, a motor cab or truck may pick up a fully loaded trailer in the usual way and bring it to the railroad freight station and then, in a matter of minutes, the loaded trailer may be transferred to the rail trailer carrier. The train then delivers this trailer, along with others, including conventional freight cars, to the railroad terminal nearest the destination of the trailer. At such terminal, the trailer is quickly transferred to a waiting motor cab and the freight delivered to the exact point of its ultimate destination. The transfer of the trailer from the motor cab to the rail trailer carrier, and vice versa, can be accomplished with the help of only the regular train crew. As will be appreciated, a number of disadvantages of long haul motor trucking can thus be avoided, such as the delays due to motor truck breakdowns, accidents, bad weather, time lost by the personal requirements of the motor cab operators, and the like.

The invention may be better understood by referring to the accompanying drawings in which a selected embodiment is shown, and in which:

Figs. 1 to 3 are diagrammatic views showing consecutive steps in the transfer of a trailer from a motor cab to the rail trailer carrier;

Fig. 4 is a side elevation, partly broken away, and with certain structural details omitted, of the railway car truck shown on the left hand side of Fig. 3;

Fig. 5 is a section taken along the line 5—5 of Fig. 4, omitting certain details;

Fig. 6 is a view taken along the line 6—6 of Fig. 4;

Fig. 7 is a fragmental enlarged view of a modified form of the railway car truck shown on the right hand side of Figs. 2 and 3; and Fig. 8 is a section taken along the line 8—8 of Fig. 4, with parts of the construction omitted.

Fig. 9 is an enlarged section along the line 9—9 of Fig. 7.

In Fig. 1 is shown a motor cab 10 having a trailer 11 attached thereto. Adjacent the trailer is a railway car truck 12 constructed according to the invention. The cab and trailer are in a position suitable for effecting the transfer of the trailer to the rail trailer carrier, of which the truck 12 forms a part. Fig. 2 shows an intermediate step in the transfer, while Fig. 3 shows the transfer completed. The motor cab and trailer are conventional, the front end 13 of the trailer being mounted on the cab through a conventional coupler generally designated 14. Ladders 11a and 11b are mounted at each end of the trailer. The railway car truck 12, which for convenience will be referred to herein as the front truck of the rail trailer carrier, is provided with a chassis member or beam 15 which extends some distance beyond each pair of wheels of the truck substantially as shown. The beam 15, which is of inverted U shape and flanged along the bottom (note Figs. 5 and 8), is mounted in the body bolster 16 of the truck in conventional manner, as will be described later in connection with Fig. 8, although it may be noted here that, as shown in Fig. 8, the body bolster 16 and the truck bolster 18 are connected through a conventional swivel connection generally designated 17. The front end of truck 12 carries the usual catwalk 19, flange or apron 20 extending from the body bolster to the end of the beam, draw bar 21, and coupling member 22. As indicated above, a platform, generally designated as 23, is supported on the truck. The method and means for supporting the platform may be any one of several, one of which is as illustrated, wherein the platform is mounted on the back end portion of one or more longitudinally extending supports. In the present instance, two such supports, designated 24, 25 (Figs. 4, 5, and 6), are shown, which in turn are supported on the truck by hanger means such as the hangers 26, 27 attached to the beam 15. A more detailed description of the platform and its means of support appears hereinafter.

The truck 12 is shown as resting on tracks 28, 29 (Fig. 5). The area between and immediately adjacent the tracks is filled in and preferably surfaced for wear (note Fig. 5) so that the wheels of the motor cab and of the trailer, as shown in Fig. 1, are approximately level with the top of the tracks. The cab and trailer are centered over the tracks in the approximate position illustrated in Fig. 1, and from this position the rear wheels of the trailer may be backed onto the platform 23 by the cab, a ramp 30 being provided for this purpose. During the backing operation, and also during the time in which the trailer is in the process of being transferred to the carrier, a wedge 31, inserted under the back end of the platform between the platform and the tracks, may be used as a safety factor to help support the load which is being imposed on the platform.

It will be understood, of course, that the invention is not limited to any particular number of sets of wheels on the trailer nor to any particular number of wheels in a set. One set of wheels is shown in the drawings, and as is illustrated in Fig. 5, there are four wheels in the set, but these quantities are merely illustrative.

With the rear wheels of the trailer mounted on the platform as shown in Fig. 2, the jacks 32 of the trailer, of which there are two, one not being visible in the drawing, are lowered to support the forward end of the trailer and the latter is then detached from the coupler 14. The motor cab is then removed. The truck 33, for convenience designated as the back truck of the rail trailer carrier, is moved forward as shown in Fig. 2. This truck is provided with a chassis member or beam 34, the front end 35 of which extends a substantial distance from the truck. The back end of the beam is provided with the usual platform or catwalk 36, flange 37, draw bar 38, and coupler 39. Trailer receiving means, generally designated 40, are provided on the truck and may consist of any suitable means for lockingly engaging the front end of the trailer to the truck 33. Such means, as shown in Fig. 2, may be the same as the coupling means 14 with which the motor cab is provided, and, briefly, comprises a relatively flat member 41 pivoted to a base 42. The member 41 is provided with conventional means for lockingly engaging the male coupling 43 on the trailer. A plate 45, secured to the beam 34 and body bolster 46, may be employed to support the coupler on the truck.

As shown in Fig. 2, the front end 35 of the beam 34 may be supported by an adjustable wheeled jack 47 at a height proper for enabling the end of the beam to be connected to the beam 15. Means are provided for detachably connecting the two beams and suitably such means may be in the form of a receiving member or sleeve 48 mounted on the end of beam 15 for receiving the free end of beam 34. The sleeve, if desired, may be on beam 34 rather than beam 15. To connect the beams, truck 33 is moved forward so that the end 35 of beam 34 enters the sleeve. As will be appreciated, beam 34 passes between the trailer jacks 32 and over the rear axle of the trailer. Suitable means for securing the beam to the sleeve are provided, such as locking pins, or bolts, or both, which may be inserted singly or in multiple through appropriately spaced openings in the beam and sleeve. For illustrative purposes such means are shown in the form of the bolts 49 (Fig. 3) which are inserted through the bolt holes 50 in the sleeve and the bolt holes 50a in the beam which are registrable with the sleeve holes. Multiple sets of bolt holes may be provided to care for any adjustment that may be necessary in connecting the beams. Before the connection is finally made, care is exercised to see that the male coupling 43 of the trailer is properly engaged in the coupler 40 on the rear truck. A plate 51, secured to the underside of the sleeve and extending rearwardly from the hanger 27, may, if desired, be employed to support the end 35 of beam 34 during the first stages of connecting the beams. Another plate 51a may be attached to the underside of the sleeve to extend forwardly of hanger 27 (Fig. 4).

With the trailer in position on the carrier, as shown in Fig. 3, additional means for supporting the load on the platform 23 may be provided by attaching to the back end thereof the hangers 52, of which there are two and which are pivotally secured to beam 34. Other support means for the platform are the rods 53, 54 (note Figs. 4 and 6), which are laid over the supports 24, 25 and which engage the opposite sides of the platform. As is apparent from Figs. 1–3, the rod 54 is applied only after the trailer has been mounted on the carrier. These rods are described in more detail hereinafter but it may be noted that they not only serve to support the platform but also to confine the trailer wheels thereon. If desired, the trailer wheels may be blocked on the platform. With the raising of the trailer jacks, the carrier is ready to be added to a train.

It will be observed that the push and pull stresses to which the rail trailer carrier is subjected during the course of a train trip are entirely taken up by the connected beams 15 and 34. The trailer itself does not absorb any of these stresses. Provision for turns is cared for in the usual way, namely, by the swiveled connections of the beams to the car trucks. The swivel connection between the trailer and the coupler 40, while convenient, is thus not essential.

Details of the platform 23 and the means of supporting it on the front truck are shown in Figs. 4–6. The platform is disposed at a height intermediate the tops and bottoms of the truck wheels, and preferably, as shown, at a height intermediate the truck axles and the bottoms of the truck wheels. As will be understood, the specific platform and supporting means illustrated are merely representative of one form of the invention and they may be varied considerably. Two longitudinal supports 24, 25, shown in the form of I-beams, are suspended from the chassis member 15 as by means of hangers 26, 27. The manner of attaching the hangers to the chassis member is illustrated in Fig. 5 and consists in fastening brackets or angle irons 55, 56 to one side of the hanger 27 and to the inner surfaces of the sides 57, 58 of the chassis member. The angle irons may be secured by means of bolts, as shown, or by welding or by other suitable means. Angle irons are also provided on the other side of the hanger for attaching the same to the chassis member. At its foot the hanger 27 has attached a pair of channel beams 59, 60, one on each side. Each of the channel beams is connected at its ends to the supports 24, 25 by means of the angle irons 61, 62, 63, 64 (note Figs. 5 and 6). At the rear portion of each support, and extending laterally thereof, frames, generally designated 65, 66, are attached. Each frame comprises four interconnected I-beams of smaller size than the supports 24, 25. As will be understood, of course, the frames may comprise any suitable number of component structural members. Frame 65 comprises a pair of beams 67, 68 extending at right angles to the support 24, and a pair of beams 69, 70 extending parallel to support 24 and connected to beams 67, 68. The beams 67, 68 are connected to support 24 as by means of the angle irons 71, 72 (Fig. 4). The parallel beams 69, 70 are interfitted to the beams 67, 68 and welded thereto. Frame 66 is similarly constructed and connected to the support 25. Plates 73, 74 are mounted on each frame and may be secured to the same in any appropriate way, as by welding them to the supports and to the frames.

Each plate and its supporting frame are additionally supported from the supports 24, 25 by the rod supports 53, 54. The vertical end portions 75, 76 (not shown) 77, 78 of the rods are disposed in cutouts in the plates and their supporting frames (note Fig. 6) and carry nuts 79, 80 (not shown), 81, 82. If desired, turnbuckles 83, 84 may be used to regulate the tension of the rods.

Plates 73, 74 may be of varying thickness and strength. Although for illustrative purposes two plates are shown, one for the right and one for the left hand trailer wheels, it will be understood that a single plate may be employed, and, further, one which may be of such thickness as to dispense with the necessity for the supporting frames. Such a plate may be supported on the members 24, 25, and resort also had to additional supporting means such as the hangers 52 and the rods 53, 54. It is contemplated that the platform 23 will, in any particular case, be of such strength as to support the load required to be transported, and that the design of the platform may be varied to care for loads of greater or lesser amounts.

As described, the method of mounting the chassis member 15 to the truck 12 is conventional. For convenience, such method is illustrated in Fig. 8, wherein the flanged chassis member 15 is shown in relation to the body bolster 16 and the truck bolster 18. The chassis member is a three-sided structure comprising the flanged vertical sides 15a and 15b and the top side 15c. The chassis member is welded to the body bolster as at 90. Side sills 91, 92 are mounted at each end of the body bolster, and a center plate 93 is riveted to its under surface, the lower part of which plate is carried within a center plate 94 mounted on the truck bolster. Side wear plates 95, 96 are also riveted to the under side of the body bolster. The truck bolster has a pair of side bearings or rollers 97, 98 which, on uneven track or when the load is unevenly distributed, may make contact with the wear plates. The bolsters are provided with a center pin 99 which passes through openings in the center plates, the purpose of the pin being to retain the truck in correct alinement with the body bolster if for any reason the center plates should become temporarily separated. The chassis member 34 is mounted to the truck 33 in a similar manner.

In Fig. 7 is illustrated a modified form of coupler that may be connected to truck 33, wherein the coupler is movable relative to the truck and chassis member. Such a coupler may have advantages, particularly during the transfer of the trailer to the carrier and vice versa. As shown, a pair of slots 100, 101 are formed in the chassis member or beam 102 on each side of the upper transverse member or top side 103 of the body bolster. A pair of plates 104, 105, having slots 106, 107 registering with the slots 100, 101, respectively, extend transversely across the beam on each side of the member 103 and are fastened to the beam as by welding. Disposed over the plates 104, 105, and the member 103 is another plate 109 to which a pair of rollers 110, 111 are attached by means of the supports 112, 113, respectively. As shown in Fig. 9, the rollers are longer than the width of the slots and engage the under surface of the top side of the chassis member adjacent the slots. The method of mounting the rollers is illustrated in Fig. 9, in which the roller 111 is shown as supported between a pair of flanged semi-circular bearings 114, 115, connected as shown, disposed in a central annular groove 116 in the roller. The upper bearing 114 may be integrally formed with the support 112. The plate 109, with the coupler mounted thereon, is thus rendered movable relative to the plates 104, 105, member 103, and beam 102.

While the invention has been described and illustrated in connection with a specific embodiment, it will be appreciated that it is capable of obvious variations without departing from its scope.

In the light of the foregoing description, the following is claimed:

1. A rail trailer carrier comprising front and rear railway car trucks having wheeled axles, a chassis member mounted on each truck and extending beyond the wheels of each said truck, a platform at the back end of the front truck at a height intermediate the axles and the bottoms of the wheels thereof, said platform being supported from the chassis member on the front truck and serving to support thereon the wheels of a trailer, means for detachably connecting said chassis members together, means for connecting the back end of said platform to the chassis member of the rear truck, and means mounted on the rear truck for lockingly engaging that end portion of said trailer opposite the trailer wheels, said rear truck serving to carry the weight of said end portion of the trailer.

2. A rail trailer carrier comprising front and rear railway car trucks having wheeled axles, a chassis member centrally mounted over each truck and extending centrally thereof and beyond each end of each truck, a platform adjacent the front truck, said platform being supported from the chassis member on the front truck and serving to support thereon the rear wheels of a trailer, means for detachably connecting said chassis members together to form a single chassis member extending underneath said trailer from truck to truck, means for connecting the back end of said platform to the chassis member of the rear truck, and means mounted on the rear truck for lockingly engaging the front end of said trailer, said trailer-engaging means being movable in a longitudinal direction and also being rotatable relatively to the rear truck and relatively to the single chassis member, said single chassis member serving to absorb the stresses and strains imposed on the trailer-loaded carrier during a train journey in which said carrier is adapted to be coupled to like carriers or to conventional railroad cars.

3. A rail trailer carrier comprising front and rear railway car trucks having wheeled axles, a chassis member centrally mounted over each truck and extending centrally of, and beyond, the wheels of each said truck, a platform adjacent the front truck at a height intermediate the axles and the bottoms of the wheels thereof, said platform being supported from the chassis member on the front truck and serving to support thereon the rear wheels of a trailer, means for detachably connecting said chassis members together to form a single chassis member extending underneath said trailer from truck to truck, means for connecting the back end of said platform to the chassis member of the rear truck, and means mounted on the rear truck for lockingly engaging the front end of said trailer, said single chassis member serving to absorb the stresses and strains imposed on the trailer-loaded carrier during a train journey in which said carrier is adapted to be coupled to like carriers or to conventional railroad cars.

4. A rail trailer carrier comprising front and rear railway car trucks having wheeled axles, a chassis member mounted over each truck and extending beyond the wheels of each said truck, a platform adjacent the front truck, said platform being supported from the chassis member on the front truck and serving to support thereon the rear wheels of a trailer, means for detachably connecting said chassis members together to form a chassis member extending underneath said trailer from truck to truck, means for connecting the back end of said platform to the chassis member of the rear truck, and means mounted on the rear truck for lockingly engaging the front end of said trailer.

5. A rail trailer carrier comprising front and rear railway car trucks having wheeled axles, a chassis member mounted over each truck and extending beyond the wheels of each said truck, a support adjacent the front truck, said support being suspended from the chassis member on the front truck and serving to receive thereon the wheels of a trailer, means for detachably connecting said chassis members together to form a chassis member extending underneath said trailer from truck to truck, means for connecting the back end of said support to the chassis member of the rear truck, and means mounted on the rear truck for lockingly engaging that end of said trailer opposite the trailer wheels, said chassis member serving to absorb the stresses and strains imposed on the trailer-loaded carrier during a train journey in which said carrier is adapted to be coupled to like carriers or to conventional railroad cars.

6. A rail trailer carrier comprising front and rear railway car trucks having wheeled axles, a chassis member mounted over each truck and extending beyond the wheels of each said truck, a platform adjacent the front truck at a height intermediate the axles and the bottoms of the wheels thereof, said platform being supported from the chassis member on the front truck and serving to support thereon the wheels of a trailer, means for detachably connecting said chassis members together to form a chassis member extending from truck to truck, and means mounted on the rear truck for lockingly engaging that end of said trailer opposite the trailer wheels, said trailer-engaging means being movable in a longitudinal direction and also being rotatable relatively to the rear truck and relatively to the chassis member.

7. A rail trailer carrier comprising front and rear railway car trucks having wheeled axles, a chassis member mounted over each truck and extending longitudinally of said carrier, a platform adjacent the front truck supported by the chassis member thereof and serving to support one end portion of a trailer, means for detachably connecting said chassis members together to form a continuous chassis member extending from truck to truck, means on the rear truck for supporting the opposite end portion of said trailer, said rear truck serving to carry the weight of said opposite end portion of the trailer, and said continuous chassis member extending underneath the trailer and serving to protect the same by absorbing the stresses and strains imposed on the trailer-loaded carrier during a train journey.

8. A rail trailer carrier comprising a pair of railway car trucks having wheeled axles, a chassis member mounted over each truck and extending longitudinally of said carrier, means adjacent one truck for holding one end portion of a trailer in an elevated position over the chassis member of said one truck, means for detachably connecting said chassis members together to form a continuous chassis member extending underneath said trailer from truck to truck, means on the other truck for supporting the other end portion of said trailer over the chassis member of said other truck, said other truck serving to carry the weight of said other end portion of the trailer, and said continuous chassis member serving to protect said trailer by absorbing the stresses and strains imposed on the trailer-loaded carrier during a train journey.

9. In combination, a rail trailer carrier having a trailer mounted thereon, said carrier comprising front and rear railway car trucks having wheeled axles, a chassis mounted over each truck and extending longitudinally of and underneath the trailer, means adjacent one truck for holding one end portion of the trailer over the chassis member of said one truck, means for detachably connecting said chassis members together to form a continuous chassis member extending from truck to truck, means on the other truck for supporting the other end portion of the trailer over the chassis member of said other truck, said latter truck carrying the entire weight of said other end portion of the trailer, said continuous chassis member serving to protect the trailer by absorbing the stresses and strains imposed on the trailer-loaded carrier during a train journey.

JOHN A. BANNEN.

References Cited in the file of this patent

UNITED STATES PATENTS

| Number | Name | Date |
| --- | --- | --- |
| 1,973,267 | Rabey | Sept. 11, 1934 |
| 2,058,955 | Culemeyer | Oct. 27, 1936 |
| 2,066,836 | Hughes | Jan. 5, 1937 |
| 2,513,552 | Dove | July 4, 1950 |